United States Patent [19]

Steele

[11] Patent Number: 4,667,141
[45] Date of Patent: May 19, 1987

[54] COIN OR TOKEN OPERATED PORTABLE CAR STARTER

[75] Inventor: Leonard B. Steele, Ft. Lauderdale, Fla.

[73] Assignee: Helen H. Smith Steele, Ft. Lauderdale, Fla.

[21] Appl. No.: 735,114

[22] Filed: May 17, 1985

[51] Int. Cl.$^4$ ............................ B65G 11/00; H02J 7/00
[52] U.S. Cl. ........................................ 320/2; 194/211; 194/904; 320/25; 340/636
[58] Field of Search ............................ 320/2–5, 320/25, 26, 48; 340/636; 194/211, 219, 241, 904

[56] References Cited

U.S. PATENT DOCUMENTS

| 3,753,072 | 8/1973 | Jurgens | 320/25 X |
| 4,052,655 | 10/1977 | Vizza | 320/2 |
| 4,161,682 | 7/1979 | Corvette | 320/2 |
| 4,184,580 | 1/1980 | Ellis, Jr. | 320/2 X |
| 4,217,534 | 8/1980 | Cole | 320/25 |
| 4,383,210 | 5/1983 | Wilkinson | 320/2 |
| 4,532,418 | 7/1985 | Meese et al. | 320/2 X |

Primary Examiner—R. J. Hickey
Attorney, Agent, or Firm—Newton, Hopkins & Ormsby

[57] ABSTRACT

A hand truck type of device provides a portable jumper battery for motor vehicles. Battery cables which connector clips are stored in the truck as is a power cable for connection to a power outlet so that the jumper battery may be recharged by a charger carried by the hand truck. Electronic circuitry connected to the cables prevents connection to the jumper battery until the connector clips have been properly connected and the vehicle battery has sufficient charge to be sensed. The sensing actuates a periodic signal and permits the system to be turned on. A token responsive switch controls a cycle timer which allows the circuitry to complete the connection to the vehicle battery.

17 Claims, 2 Drawing Figures

COIN OR TOKEN OPERATED PORTABLE CAR STARTER

BACKGROUND OF THE INVENTION

At various sites such as vehicular parking lots, it is frequently necessary for a motorist to require the services of an auxiliary battery in order to start his vehicle and it would be extremely convenient if such a service could be provided at minimum of expense to the perspective user. At the same time, it is desirable that any such apparatus be relatively foolproof in operation and, in particular, to avoid arcing when the jumper cables are attached to the user's battery.

BRIEF SUMMARY OF THE INVENTION

The invention provides a device of the character described above and incorporates same in an easily maneuverable hand truck type of device which includes retractable jumper cables and a rectractable power connection line whereby an internally mounted charger may periodically be used to recharge the storage battery carried by the hand truck device.

The invention also incorporates novel electronic circuit features which render the device relatively foolproof and safe in operation.

BRIEF DESCRIPTION OF THE DRAWING FIGURES

DETAILED DESCRIPTION OF THE INVENTION

Figure 1:
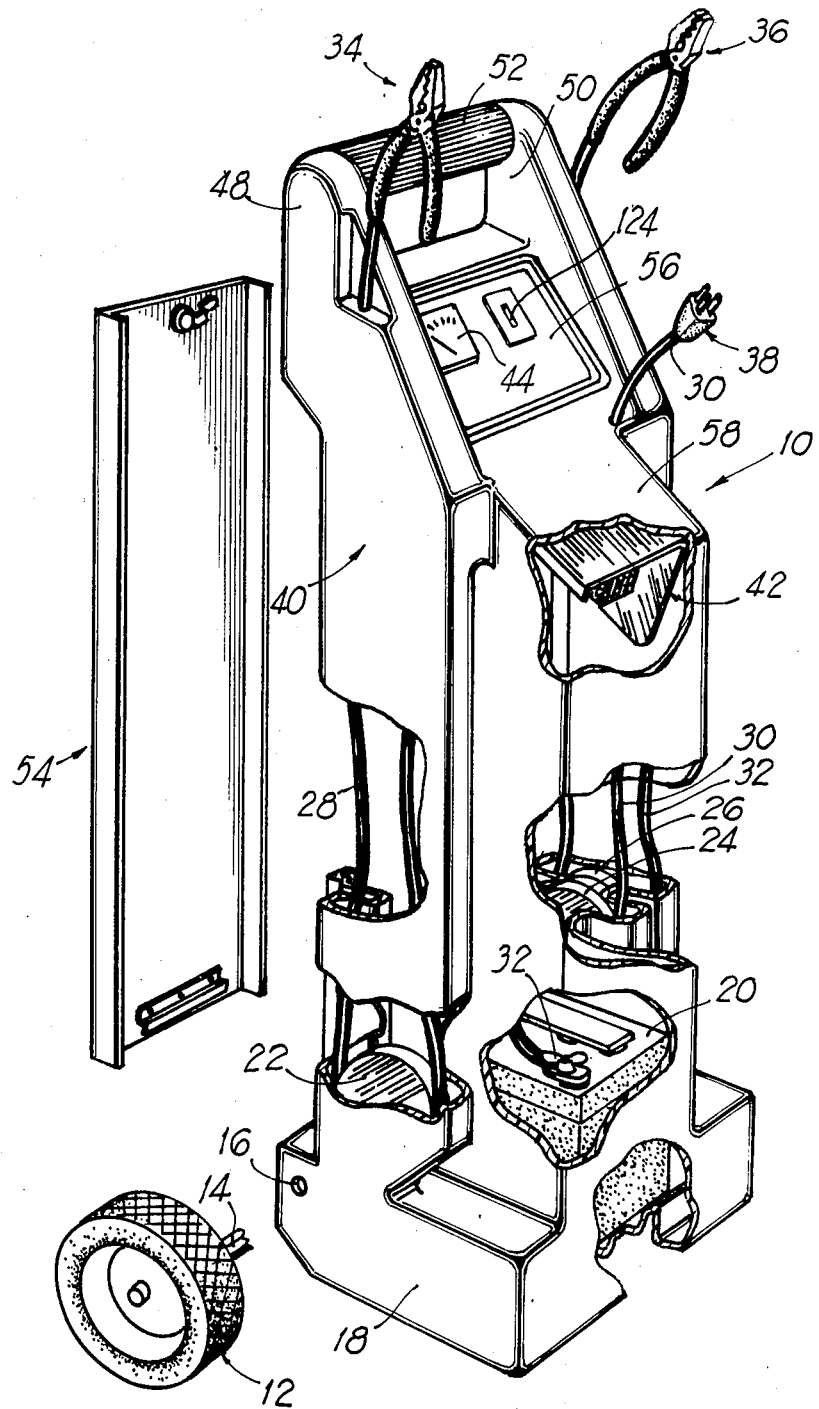
FIG. 1 is a perspective view partially broken away and exploded showing a preferred embodiment of the present invention.

The device as shown in FIG. 1 essentially comprises a hand truck type of device indicated generally by the reference character 10 having a pair of supporting wheels, one of which is indicated by the reference character 12 in exploded position and rotatably mounted on a suitable axle 14 mounted within the opening 16 at the rear of the base 18 of the truck. To provide a low center of gravity to aid maneuverability of the hand truck device 10, a storage battery 20 is mounted in the base portion 18 and is suitably connected through battery cables, one of which is indicated at reference character 22 in FIG. 1, to the circuitry hereinafter described in connection with FIG. 2. Just above the base 18 and to either side of the battery 20 are the several guide reels 32, 24 and 26 over which are respectively trained the jumper cable 28, the power cord 30 and the other jumper cable 32. The two jumper cables are terminated by battery clamps or clips indicated generally by the reference characters 34 and 36 whereas the power cord or cable 30 terminates in a conventional threepronged plug 38. Take up reels for the three cables are disposed in the upper portion of the device indicated generally by the reference character 40 to either side of a central panel 42 which forms part of a battery charger to which the power cord 30 is attached and which may, if desired, include suitable instruments or other indicia as at 44 to advise of the charging rate when the plug 38 is connected to a power outlet and the charger is charging the storage battery 20. At the upper extremity of the device, a pair of projecting ears 48 and 50 are interconnected by a hand grip device 52. The interior of the truck body is essentially hollow and the entire body may be formed, for example, of a suitable synthetic resinous material and provides an open back to which a removable cover 54 may be connected to complete the assembly. The entire device is relatively lightweight, the heaviest component being a storage battery 20 which is located in such a position as assures that the device has a three-point stance which can be unattended and left upright but can, at the same time, be readily tipped backwards by manipulation on the hand grip member 52 and trundled about in the usual manner of a hand truck device. On the reverse side of the front panel 58 on the interior of the body is mounted the circuit board assembly 42 containing the circuitry shown in FIG. 2, additionally provided a front operating panel 42, which carries various lights and token slot as is described hereinafter but not shown specifically in FIG. 1.

Figure 2:
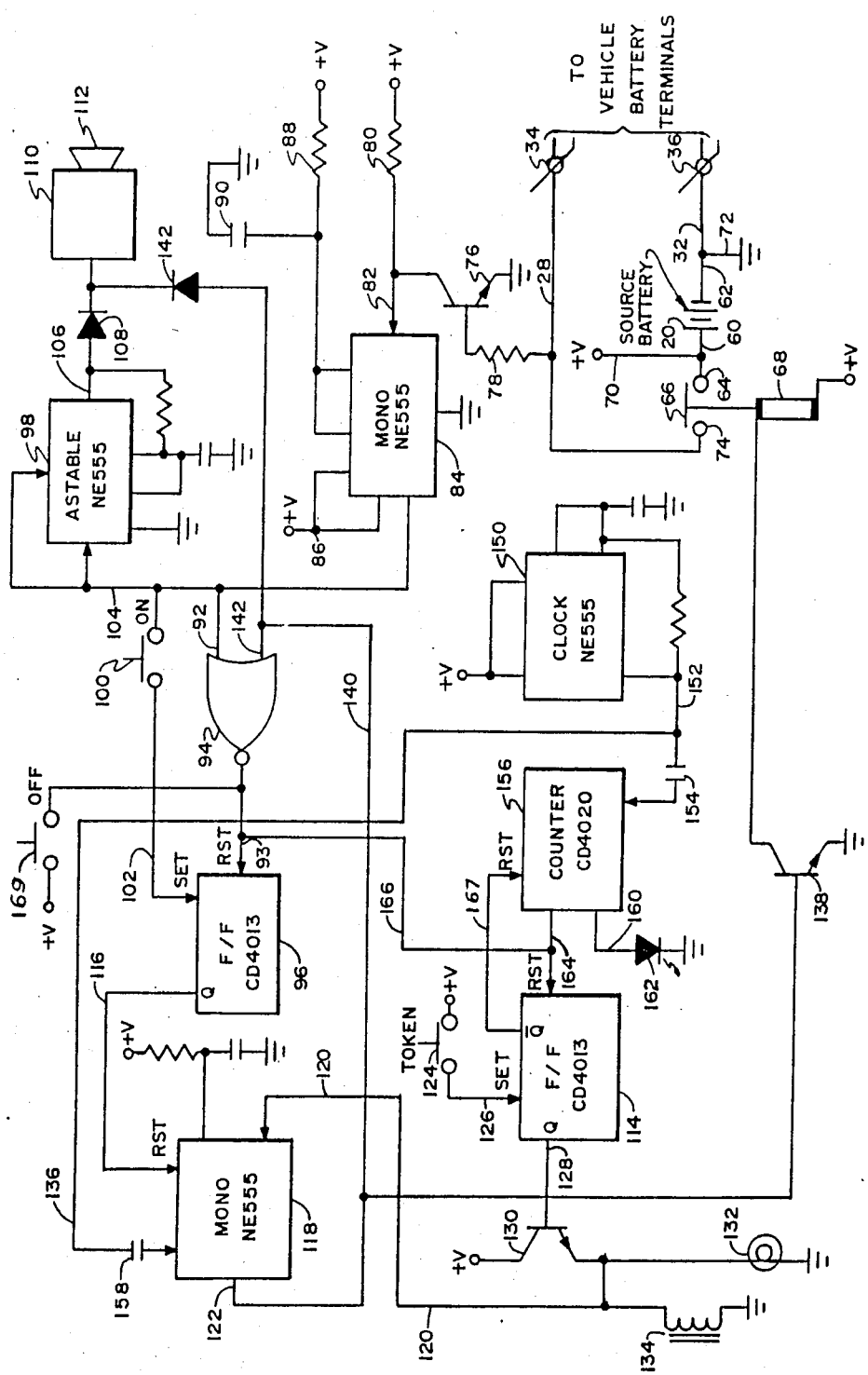
FIG. 2 is a schematic diagram illustrating the electrical components of the invention in a preferred embodiment thereof.

The circuitry, according to FIG. 2, contains a number of novel features which will appear as the description proceeds. As shown, the battery 20 has positive and negative terminals as indicated at reference characters 60 and 62, the positive terminal 60 being connected to the contact 64 of a relay operated switch indicated generally by the reference character 66, the relay being illustrated at 68. The positive terminal 60 provides a positive voltage supply as indicated by the reference character 70 whereas the negative terminal 62 is grounded as indicated at 72. The positive jumper cable is connected to the other contact 72 of the switch 66 whereas the negative jumper cable 32 is connected to the negative terminal of the battery 20 and the base electrode of an NPN transistor 76 is connected through a resistor 78 to the positive jumper cable connection 28. The collector-emitter path of the transistor 76 is connected through a resistor 78 to the positive jumper cable connection 28. The connector-emitter path of the transistor 78 is through the resistor 80 between the positive voltage source and ground connection as is illustrated, the condition of the signal at the conductor 82 normally being high, that is, it is at or substantially at the positive voltage supply. The purpose of the transistor 76 is to sense whether the battery terminal connectors 34 and 36 have been connected to the vehicular battery and, if so, whether they have been connected to the proper terminals, e.g., positive to positive and negative to negative. If the clips 34 and 36 have been properly connected, and if the vehicular battery holds a charge of at least about 1.5 volts, the base electrode of the transistor 76 will be biased sufficiently to cause this transistor to conduct and thereby place the signal at the conductor 82 in a low or substantially ground state.

The signal at 82 triggers a monostable multivibrator device indicated generally by the reference character 84. As shown, this device is an NE555. In particular, its pins four and eight are directly connected to the positive voltage supply as by the conductor 86, the pins six and seven are connected through the resistor 88 to the positive voltage supply and are connected to ground through the capacitor 90 to provide the monostable operation. When the triggering signal appears at the conductor 82, the input to pin two of the device 84, the output at the conductor 92 from pin three of the device goes high. The positive voltage output at the conductor 92 does several things. First, it causes the output conductor 93 of the NOR gate 94 to go low and thus remove a reset signal on the device 96. Secondly, it provides power for the device 98 and permits the same to go into self-oscillation. Thirdly, the switch indicated generally by the reference character 100 is conditioned to apply a "set" signal at the conductor 102 to the device 96, the purpose of which will be presently apparent.

The astable device 98 is another NE555 connected as can be seen as an oscillator, the required power for the device 98 being supplied over the conductor 104 to pins four and eight of the device so that, when energized, the signal at 106 is oscillatory and which operates in conjunction with the diode 108 to energize the sound producing device 110 periodically so as to produce a pulse of "beeping" sound from the speaker 12 and thus apprise the user that the battery connections 34 and 36 have been properly connected.

The device 96 and 114 each form half of a CD4013 and once the reset input at pin four of the device 96 has been removed, such device is ready to be set by momentary depression of the switch 100 to cause its output at 116 to go low and thus remove the reset signal to the pin four of the monostable multivibrator device 118. It should be noted at this point, however, that the device 118 is not as yet energized with power to its pin eight to which the conductor 120 is connected so that, despite the fact that the reset signal at 116 has been removed by toggling of the flip flop 96, there is no output at the conductor 122 connected to pin three of this device 118.

Before the device may be used, the user must insert a token to momentarily close the switch 124. Such operation momentarily applies a "set" signal at the conductor 126 connected to pin eight of the flip flop device 114 which causes its Q output at pin one, conductor 128 to go high and thus bias the transistor switch 130 to an on condition. At the same time, the Q output goes low so that the conductor 167 removes the reset to the counter 156. The turning on of the transistor 130 accomplishes several things. First, it causes the energization of the "on" light 132; it energizes the winding 134 of a counter so as to record the number of times a token has been inserted to close the switch 124 momentarily; and it provides over the conductor 120 the requisite positive voltage supply to energize and thereby render operative the device 118 as previously described. When powered up, the device 118 causes the output at the conductor 122 to go high upon the first negative going clock pulse at the conductor 136 from the clock hereinafter described, so that the base electrode of the transistor switching device 138 is biased to cause it to conduct and thereby energize the relay 68 and close the switch 66 so that, now, the positive jumper cable 28 is directly connected to the positive terminal 60 of the battery 20. At the same time, through the conductor 140, a high input is provided to the other conductor 142 of the NOR gate 94 and, in addition, a steady dc voltage is applied, through the diode 142 to the sound generating unit 110 which now emits a continuous tone.

The clock of the device is indicated generally by the reference character 150 and is another NE555 device connected as shown to provide a free running oscillator or clock having a frequency in the order of about 10 Hz at its output conductor 152 and which is coupled, through the capacitor 154 to the counter device 156, and through the capacitor 158 to the aforesaid device 118. The device 156 is a DC4020 counter which provides a pulse output at every eighth pulse of the clock 150 at the conductor 160 so as periodically to energize the LED 162 to give an indication that the counting cycle is in progress. The counter 156 has the further output at 164 whichafter 2048 pulses of the clock 150 provides a high output to reset the flip flop 114 and also, over the conductor 166, to reset the flip flop 96. When the flip flop 114 is reset, the transistor is switched off to interrupt power at 120 to the monostable 118 and thus allow the relay switch 66 to open. At the same time, the counter 156 is reset to zero by the Q signal at the conductor 167. Since there is no way to remove the reset signal at 167 and produce a high output at 128 to reenergize the relay 68 except by inserting another token to close the switch 124 momentarily, once the counter 156 has counted out, a new token is required. As noted, the frequency of the clock 150 is about 10 Hz which allows somewhat more than three minutes of operation after a token is inserted before the counter 156 counts out.

The cycle may be terminated at any time after the token switch 124 has been operated by depressing the off switch 169, the effect of which is to reset the flip flop 96 and the flip flop 114 and to reset the counter 156 to zero. Prior to insertion of a token, the off switch 169 and the on switch 100 may be operated as many times as may be desired.

It will be seen that the transistor 76 is a sensing means which determines whether the battery clips 34 and 36 have been connected to the proper vehicle battery terminals and will respond so long as the vehicle battery holds some charge. Thus, if the vehicle battery is defective such as by being internally shorted, the sensing means will not respond. The monostable device 84 functions as an enabling means in that it powers the astable device 98 to produce the pulsing tone, removes the reset signal to the flip flop 96, and conditions the on switch 100 to allow the flip flop 96 to be toggled so as to prepare the monostable 118 to energize the relay 68 when the monostable 118 is powered. The flip flop 114 functions as a cycle control means in that it will power the monostable 118 and start the cycle of the counter 156 only after a token has been inserted to close the switch 124 momentarily.

The user has the choice of depressing the on switch 100 after connecting the clips 34 and 36 either before or after a token has been inserted. He will conserve cycle time, however, if he inserts the token only when battery connection has been made and the on switch 100 has been depressed. It should be noted that premature insertion of a token will not start the cycle because the reset signal will be present at the NOR gate output 93 and consequently at the conductor 164.

What is claimed is:

1. In a storage battery emergency supply, a source battery having a jumper cable connected to one of its terminals, normally open switch means connected to its other terminal and a second jumper cable connected to said switch means whereby a vehicle battery which requires emergency power may be readied for connection to the source battery by connecting said jumper cables to those terminals of the vehicle battery which correspond to the terminals of the source battery to which the respective jumper cables are connected, sensing means for electrically sensing when the jumper cables are connected correctly to the corresponding terminals of the vehicle battery and for readying said switch means for closure, token responsive means for effecting closure of said switch means, and an indicator means actuated in sequence first by the sensing means and secondly by the token responsive means.

2. In a storage battery emergency supply as defined in claim 1 wherein said token-responsive means includes a counter to limit the time during which said switch means remains closed.

3. In a storage battery emergency supply as defined in claim 2 wherein said sensing means includes a monostable device, and manual switch means connected to the output of said monostable device for readying said switch means for closure.

4. In a storage battery emergency supply as defined in claim 3 wherein the indicator means comprises an audible signal device actuated by said sensing means to produce a periodic audible tone.

5. In a storage battery emergency supply as defined in claim 1 wherein the indicator means further comprises an audible signal device actuated by said token responsive means to produce a continuous audible tone.

6. In a storage battery emergency supply as defined in claim 1 wherein said sensing means includes a monostable device, and manual switch means connected to the output of said monostable device for readying said switch means for closure.

7. In a storage battery emergency supply as defined in claim 2 wherein the indicator means comprises an audible signal device actuated by said sensing means to produce a periodic audible tone.

8. In a storage battery emergency supply as defined in claim 7 wherein the indicator means further comprises an audible signal device actuated by said token responsive means to produce a continuous audible tone.

9. In a storage battery emergency supply as defined in claim 1 wherein the indicator means comprises an audible signal device actuated by said sensing means to produce a periodic audible tone.

10. In a storage battery emergency supply as defined in claim 4 wherein the indicator means includes an audible signal device actuated by said token responsive means to produce a continuous audible tone.

11. A storage battery emergency supply device comprising a hand truck, a source battery carried by said hand truck, jumper cables carried by said hand truck and including connector clips adapted to be attached to the terminals of a vehicular battery, electronic control means carried by said hand truck for effecting connection between the source battery and the vehicle battery subsequent to correct connection of said connector clips to the terminals of the vehicle battery, sensing means for electronically sensing when the jumper cables are connected to the corresponding terminals of the vehicle battery and for readying said switch means for closures, and token responsive means for effecting closure of said switch means, and an indicator means actuated in sequence first by the sensing means and secondly by the token responsive means.

12. A storage battery emergency supply device as defined in claim 11 wherein said electronic control means includes normally open switch means having a contact connected to one termianl of the source battery and a second contact connected to one of said cables.

13. A storage battery emergency supply device as defined in claim 12 wherein said token responsive means includes a counter to limit the time during which said switch means remains closed.

14. A storage battery emergency supply device as defined in claim 13 wherein said sensing means includes a monostable device, and manual switch means connected to the output of said monostable device for readying said switch means for closure.

15. A storage battery emergency supply device as defined in claim 14 wherein the indicator means includes an audible signal device actuated by said sensing means to produce a periodic audible tone.

16. A storage battery emergency supply device as defined in claim 15 wherein the indicator means includes an audible signal device actuated by said token responsive means to produce a continuous audible tone.

17. A storage battery emergency supply device as defined in claim 11 wherein said hand truck is free standing.

* * * * *